(12) United States Patent
Willers et al.

(10) Patent No.: US 8,123,143 B2
(45) Date of Patent: Feb. 28, 2012

(54) THERMOSTATIC VALVE FOR CONNECTING AN AUTOMATIC TRANSMISSION WITH AN OIL COOLER

(75) Inventors: Eike Willers, Stuttgärt (DE); Andreas Auweder, Vaihingen/Enz (DE)

(73) Assignee: Behr Thermot-Tronik GmbH, Kornwestheim (DE)

( * ) Notice: Subject to any disclaimer, the term of this patent is extended or adjusted under 35 U.S.C. 154(b) by 585 days.

(21) Appl. No.: 11/654,715

(22) Filed: Jan. 18, 2007

(65) Prior Publication Data
US 2007/0164123 A1    Jul. 19, 2007

(30) Foreign Application Priority Data
Jan. 19, 2006    (DE) .......................... 10 2006 003 271

(51) Int. Cl.
G05D 23/02    (2006.01)
G05D 23/12    (2006.01)
(52) U.S. Cl. .................. 236/93 R; 236/93 A; 236/92 R; 236/101 A
(58) Field of Classification Search ............... 236/93 R, 236/18, 99 K, 101 A, 42, 93 A, 92 R, 92 D, 236/34.5
See application file for complete search history.

(56) References Cited

U.S. PATENT DOCUMENTS

| | | | |
|---|---|---|---|
| 3,300,135 A * | 1/1967 | Slater et al. .................. | 236/34.5 |
| 3,554,440 A | 1/1971 | Austin et al. .................. | 236/34.5 |
| 3,754,706 A | 8/1973 | Tao .............................. | 236/92 R |
| 3,907,199 A * | 9/1975 | Kreger ....................... | 237/12.3 B |
| 3,913,831 A * | 10/1975 | Talak .......................... | 236/34.5 |
| 4,190,198 A | 2/1980 | Casuga et al. ............... | 236/34.5 |
| 4,537,346 A | 8/1985 | Duprez ........................ | 236/34.5 |
| 5,791,557 A | 8/1998 | Kunze ........................... | 236/345 |
| 6,012,550 A | 1/2000 | Lee .............................. | 184/6.22 |
| 6,499,666 B1 | 12/2002 | Brown ........................ | 236/34.5 |
| 6,935,569 B2 | 8/2005 | Brown et al. ................. | 236/34.5 |
| 6,962,295 B2 * | 11/2005 | Ieda ............................ | 236/34.5 |
| 2003/0136855 A1 | 7/2003 | Brown ....................... | 236/101 R |
| 2004/0001142 A1* | 1/2004 | Kumhyr ...................... | 348/143 |
| 2007/0001142 A1* | 1/2007 | Kratzer ...................... | 251/129.18 |

FOREIGN PATENT DOCUMENTS

| | | |
|---|---|---|
| DE | 2 250 335 | 5/1973 |
| DE | 197 56 180 A1 | 6/1999 |

OTHER PUBLICATIONS

German Search Report.

* cited by examiner

*Primary Examiner* — Ljiljana Ciric
*Assistant Examiner* — Travis Ruby
(74) *Attorney, Agent, or Firm* — K&L Gates LLP

(57) ABSTRACT

In a thermostatic valve for connecting an automatic transmission with an oil cooler, wherein the connection between an inlet conduit 12 for oil coming from the transmission and an outlet conduit 13 to the oil cooler is released or blocked by valve slider element 22, which is actuated by a thermostatic actuating element 16, 17 and is spring-loaded by a restoring spring 21, the valve slider element 22 with the restoring spring 21 is designed as a pressure-control valve which, with the open connection between the inlet conduit 12 for oil coming from the transmission and the outlet conduit 13 to the oil cooler, opens a bypass conduit 24 when a predetermined pressure of the oil is exceeded.

5 Claims, 2 Drawing Sheets

THERMOSTATIC VALVE FOR CONNECTING AN AUTOMATIC TRANSMISSION WITH AN OIL COOLER

CROSS-REFERENCES TO RELATED APPLICATIONS

This application claims the benefit of German patent application 10 2006 003 271.3 filed Jan. 19, 2006, herein incorporated by reference.

FIELD OF THE INVENTION

The invention relates to a thermostatic valve for connecting an automatic transmission with an oil cooler. More particularly, the invention relates to such a thermostatic valve having an inlet conduit for oil received from the transmission, an outlet conduit for oil delivered to the oil cooler, an inlet conduit for oil received from the oil cooler, and an outlet conduit for oil delivered to the transmission, wherein the connection between the inlet conduit for oil from the transmission and the outlet conduit to the oil cooler is selectively opened or blocked by means of a valve element which can be actuated by a thermostatic actuating element and is spring-loaded by means of a restoring spring.

BACKGROUND OF THE INVENTION

A valve of the type mentioned at the outset is known, for example from U.S. Pat. No. 5,791,557, wherein a bypass conduit is provided which keeps the inlet for oil coming from the transmission connected with the outlet to the transmission as long as the thermostatic actuating element has not yet reacted. When the thermostatic actuating element reacts because of a temperature increase in the oil, the bypass is closed. In extreme weather conditions, it is possible that this thermostatic valve does not supply sufficient oil to the automatic transmission and is therefore damaged. If there are very cold outside air temperatures, it can happen that the oil leaving the transmission and flowing in the bypass is heated to such a degree that the thermostatic actuating element reacts and opens the connection between the inlet conduit for the oil coming from the transmission and the outlet conduit to the oil cooler and blocks the bypass. However, the very cold outside temperatures can lead to the oil in the oil cooler being cooled to such a degree that the flow resistance in the oil cooler becomes so great that insufficient oil flows back to the automatic transmission.

OBJECT AND SUMMARY OF THE INVENTION

An object of the invention is to design a thermostatic valve of the type above-mentioned in such a way that assures, even at very low outside temperatures, that a sufficiently large amount of oil always flows back to the automatic transmission.

This object is attained in that the valve element with the restoring spring is embodied as a pressure-control valve which, in a release position and with the connection between the inlet conduit for oil coming from the transmission and the outlet conduit to the oil cooler, opens a bypass conduit between the inlet conduit for oil coming from the transmission and the outlet conduit to the transmission when a predetermined pressure of the oil is exceeded.

In the embodiment in accordance with the invention, the thermostatic valve acts as a pressure-control valve in the release position, i.e. when the connection between the inlet conduit for oil coming from the transmission and the outlet conduit to the cooler is open, which makes possible a bypass back to the transmission. It is assured in this way that at very low outside temperatures oil flows back to the transmission in sufficient amounts even if an initially provided bypass connection is closed because of the action of the thermostatic valve.

By means of the design of the invention it is provided that the bypass conduit is arranged in the actuating path of the valve element in such a way that the valve element, which is driven by the thermostatic actuating element, keeps the bypass conduit closed up to a predetermined oil temperature. In this way it is assured that the thermostatic valve does not open the bypass conduit because of a high oil temperature, so that all of the oil flows through the oil cooler even at very high oil temperatures and does not bypass the oil cooler and is returned, uncooled, to the transmission.

Further characteristics and advantages of the invention ensue from the following description of the embodiment represented in the drawings.

DETAILED DESCRIPTION OF THE PREFERRED EMBODIMENT

Figure 1:
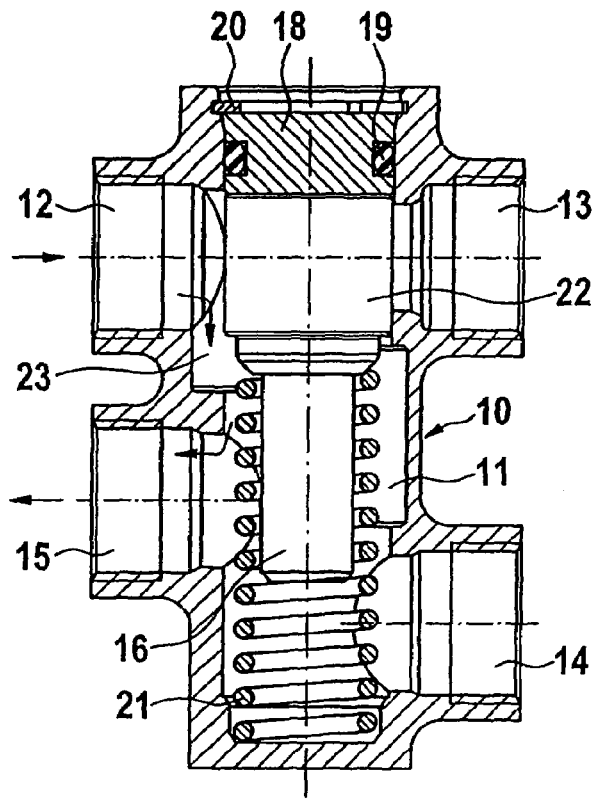
FIG. 1 represents an axial sectional view through a thermostatic valve in accordance with the invention in the cold state.

A central receiving bore 11 is provided in a valve housing 10, into which an inlet conduit 12 for oil coming from an automatic transmission leads. An outlet conduit 13 leading to an oil cooler follows the receiving bore 11 on the side located opposite the inlet conduit 12. Furthermore, an inlet conduit 14, through which oil coming from the oil cooler is returned, is connected to the receiving bore 11. This oil flows through an outlet conduit 15 back to the transmission. A thermostatic actuating element is arranged in the receiving bore 11 and has a housing which is filled with an expandable material whose volume changes as a function of temperature. The expandable material drives a working piston 17 out of the housing 16 of the thermostatic actuating element, which piston is supported on a sealing plug 18 and by means of which the receiving bore 11 is sealingly closed. The plug 18 is provided with a sealing ring 19 and is maintained in its position by means of a retaining ring 20.

The housing 16 of the thermostatic actuating element is spring-loaded by means of a restoring spring 21, whose opposite end is supported on a closed bottom of the receiving bore 11. The housing 16 of the thermostatic actuating element is fixedly connected with a valve slider element 22, which is guided in the receiving bore 11 and which, in the blocking position in accordance with FIG. 1, blocks the connection between the inlet conduit 12 for oil coming from the transmission and the outlet conduit 13 to the oil cooler. A longitudinal groove 23 has been milled into the side of the receiving bore 11 facing the inlet conduit 12 for oil coming from the transmission which, in the blocking position, i.e. when the connection between the inlet conduit 12 for oil coming from the transmission and the outlet conduit 13 to the oil cooler is blocked, creates a bypass connection between the inlet conduit 12 for oil coming from the transmission and the outlet conduit 15 to the transmission, such as shown in FIG. 1.

The oil in the transmission, which is heated during operation, initially flows over the longitudinal groove 23 used as a bypass connection to the housing on the thermostatic actuating element, so that the latter is heated and the working piston 17 is extended when the opening temperature has been reached. The opening temperature can lie at 70° C., for example. In this case the thermostatic actuating element is laid out in such a way that it is completely opened at 80° C., i.e. when it has substantially reached the position in accordance with FIG. 2. In this release position the valve slider element 22 has been displaced to such an extent, that it has been moved past the end of the longitudinal groove 23 and therefore blocks the bypass connection between the inlet conduit 12 for oil coming from the transmission and the outlet conduit 15 to the transmission. Therefore the entire oil coming from the transmission flows via the outlet conduit 13 to the oil cooler, and from there to the inlet conduit 14 and through the outlet conduit 15 back to the transmission.

As had already been mentioned at the outset, in case of extremely low outside temperatures (ambient temperatures), the situation can occur that oil leaving the transmission has already reached a temperature, for example 80° C., which causes a complete release of the connection between the inlet conduit 12 for oil coming from the transmission and the outlet conduit 13 to the oil cooler and blocks the bypass connection via the longitudinal groove 23, while the oil reaching the oil cooler is cooled to such an extent there that a very high flow resistance occurs in the oil cooler. In this case the danger exists that the transmission is not provided with sufficient oil, since sufficient oil does not flow back to the transmission via the outlet conduit 15. To take this into account, the valve slider element 22, together with the restoring spring 21, is laid out in such a way that in the release position in accordance with FIG. 2 it assumes the function of a pressure-control valve. To this end, first the face of the valve slider element 22, which can be charged with pressure opposite the force of the restoring spring 21, and the restoring spring 21 are laid out in such a way, that in case of increased pressure, for example 4 bar to approximately 5.5 bar, the valve slider element 22 is displaced in the receiving bore 11 against the effect of the restoring spring 21. A longitudinal groove 24, which has been milled into the receiving bore 11 diametrically opposite the longitudinal groove 23, is opened because of this axial displacement and establishes a bypass conduit between the inlet conduit 12 for oil coming from the transmission and the outlet conduit 15 to the transmission. In this way it is also assured in connection with the described case that a sufficient amount of oil flows back to the transmission. The axial length of the longitudinal groove 24 is of such dimensions that the valve slider element 22, when in the position which can be assumed because of the overpressure, releases a sufficiently large gap between the edge of the valve slider element 22 facing the working piston 17 and the longitudinal groove 24, as well as between the end of the valve slider element 22 facing the housing 16 of the thermostatic actuating element (FIG. 3). Moreover, the longitudinal groove 24 is arranged in the direction of the displacement path of the valve slider element 22 in such a way that the bypass conduit is not released when the housing 16 with the valve slider element 22 is extended because of the oil temperature. In this way it is assured that even at an oil temperature of, for example 160° C., the entire amount of oil is conducted through the oil cooler. The pressure-control valve only reacts when a pressure of 4 bar (or 5.5 bar) has been reached.

In connection with a modified embodiment it is provided that the working piston 17 is supported on a closed wall of the valve housing 10, and the restoring spring 21 on a plug similar to the plug 18. In connection with a further modified embodiment, the receiving bore 11 is designed as a through-bore and is provided with plugs on each of its two ends. In connection with another embodiment, the geometry, and in particular the arrangement of the inlet and outlet conduits 12, 13, 14, 15 has been selected to be such that the two longitudinal grooves 23, 24 are not arranged diametrically opposite each other, but for example on the same side.

Figure 2:
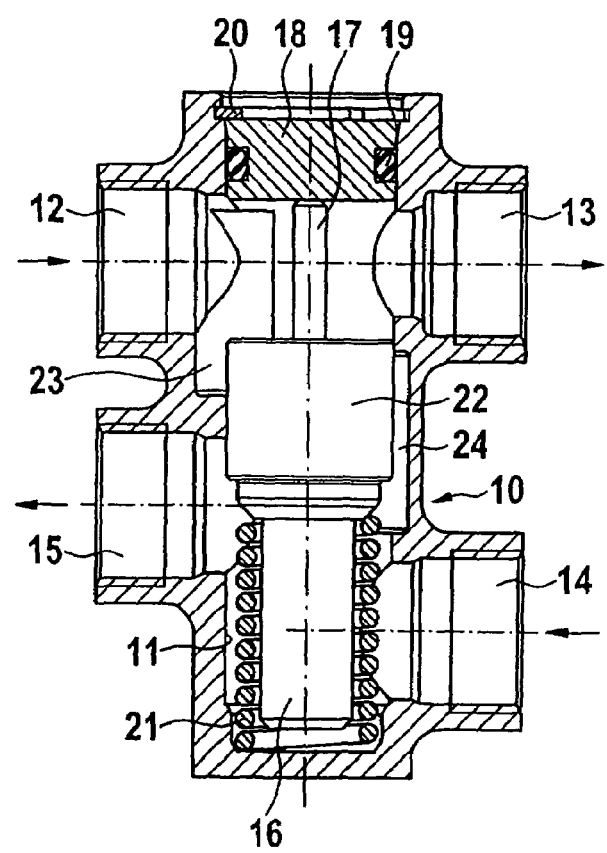
FIG. 2 shows the thermostatic valve in accordance with FIG. 1 with the valve element open.
Figure 3:
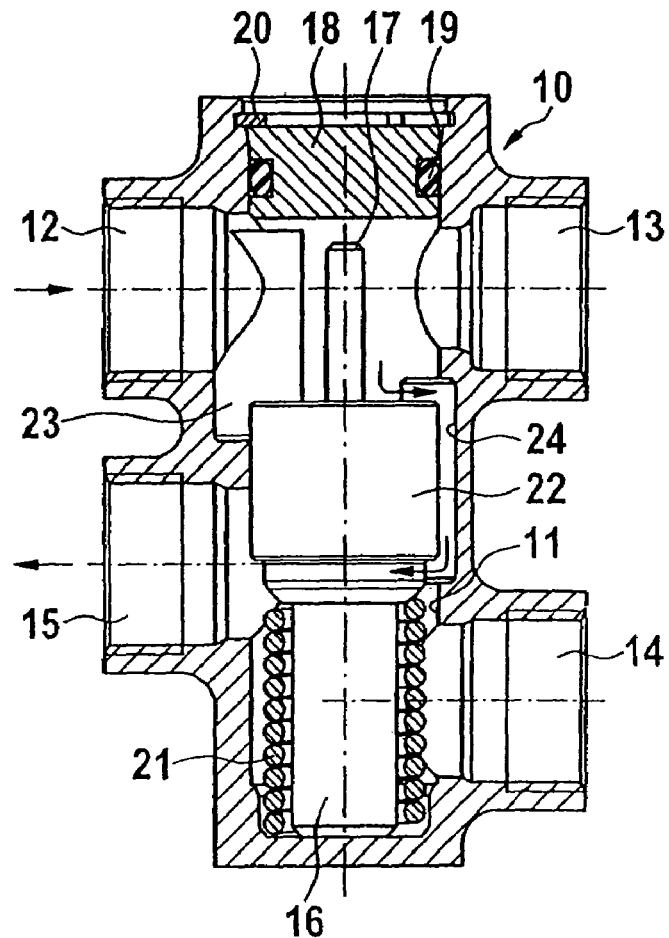
FIG. 3 represents an axial sectional view through a thermostatic valve when overpressure occurs.
Figure 4:
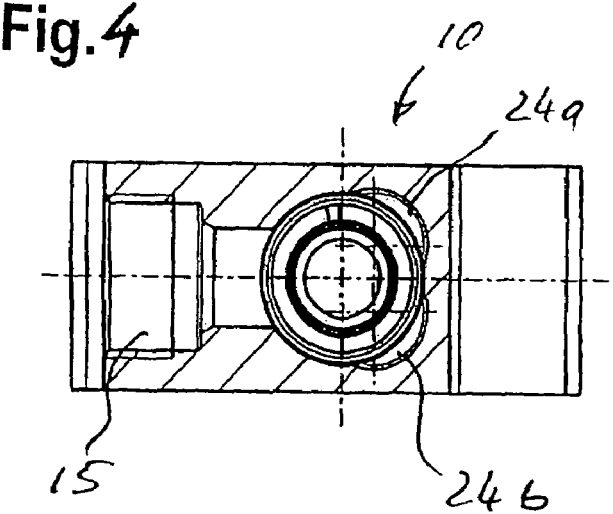
FIG. 4 represents a radial sectional view through a modified embodiment of a thermostatic valve in accordance with the invention.

FIG. 4 represents a radial sectional view through an embodiment of a thermostatic valve which in principle corresponds to the embodiment in accordance with FIGS. 1 to 3. The radial section extends through the outlet conduit. In place of a longitudinal groove 24 acting as a bypass connection of the exemplary embodiment in accordance with FIGS. 1 to 3, two parallel longitudinal grooves 24a, 24b are provided, between which a guide section 25 for the valve slider element has been retained.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A thermostatic valve for connecting an automatic transmission with an oil cooler, comprising:
    (a) a valve housing defining a first inlet conduit for oil received from the transmission, a first outlet conduit for oil delivered to the oil cooler, a second inlet conduit for oil received from the oil cooler, a second outlet conduit for oil delivered to the transmission, and a central area communicating with said first inlet conduit, said first outlet conduit, said second inlet conduit and said second outlet conduit, and
    (b) a valve device disposed within the valve housing for controlling oil flow communication among said first inlet conduit, said first outlet conduit, said second inlet conduit and said second outlet conduit in dependence upon prevailing temperature of the oil and upon prevailing pressure of the oil, the valve device comprising:
        (i) a single valve element disposed for sliding movement in said central area,
        (ii) a spring exerting a biasing force urging the valve element slidably in a first direction into a first position and being yieldable for permitting sliding movement of the valve element in an opposite displacement direction into a second position and a third position, (iii) a thermostatic actuating element for actuating sliding movement of the valve element in said displacement direction against the biasing force of the spring into the second position in dependence upon a predetermined prevailing oil temperature, (iv) wherein the slidable valve element in the first position thereof blocks oil flow communication between the first inlet conduit and the first outlet conduit and simultaneously establishes a first bypass for oil flow communication between the first inlet conduit and the second outlet conduit, (v) wherein the slidable valve element in the second position thereof opens oil flow communication between the first inlet conduit and the first outlet conduit and simultaneously blocks oil flow communication via the first bypass between the first inlet conduit and the second outlet conduit, and (vi) wherein the biasing force of the spring is selected to yield under a predetermined pressure prevailing in the oil, independently of the temperature of the oil, to further move the valve element in said displacement direction into said third position opening communication between the first inlet conduit and the first outlet conduit and simultaneously a second bypass is established for oil flow communication between the first inlet conduit and the second outlet conduit.

2. The thermostatic valve in accordance with claim 1, characterized in that the central area of the valve housing is configured as a receiving bore into which the first and second inlet conduits and the first and second outlet conduits communicate, and the valve element is disposed for sliding movement within the receiving bore between the first inlet conduit and the first outlet conduit.

3. The thermostatic valve in accordance with claim 2, characterized in that the valve element is fixedly connected with a housing which is acted upon by the spring and wherein the thermostatic actuating element has a working piston supported on a detent.

4. The thermostatic valve in accordance with claim 2, characterized in that a longitudinal groove is formed in the receiving bore and is opened when the valve element is in the first position for bypass communication between the first inlet conduit and the second outlet conduit, and the longitudinal groove is closed in the third release position of the valve element.

5. The thermostatic valve in accordance with claim 4, characterized in that another longitudinal groove is formed in the receiving bore diametrically opposite the first mentioned longitudinal groove, the another longitudinal groove being opened when the valve element is in the third position for bypass communication between the first inlet conduit and the second outlet conduit.

* * * * *